United States Patent [19]
Smith

[11] Patent Number: 5,426,542
[45] Date of Patent: Jun. 20, 1995

[54] ELECTRONICALLY COUPLED HIGH-IMPEDANCE MAGNETORESISTIVE PREAMPLIFIER

[75] Inventor: Robert F. Smith, San Jose, Calif.

[73] Assignee: Seagate Technology, Inc., Scotts Valley, Calif.

[21] Appl. No.: 184,582

[22] Filed: Jan. 21, 1994

[51] Int. Cl.⁶ .......................... G11B 5/02; G11B 5/03
[52] U.S. Cl. .................................... 360/67; 360/66
[58] Field of Search ................. 360/67, 66; 330/60, 330/103, 291

[56] References Cited

U.S. PATENT DOCUMENTS

| | | | |
|---|---|---|---|
| 3,814,863 | 6/1974 | O'Day et al. | 360/113 |
| 4,040,113 | 8/1977 | Gorter | 360/113 |
| 4,191,977 | 3/1980 | Lewkowicz | 360/66 |
| 4,492,997 | 1/1985 | Arai et al. | 360/113 |
| 4,520,311 | 5/1985 | Petr et al. | 324/117 |
| 4,580,178 | 4/1986 | Wuori et al. | 360/67 |
| 4,706,138 | 11/1987 | Jove et al. | 360/67 |
| 4,712,144 | 12/1987 | Klaassen | 360/67 |
| 4,716,306 | 12/1987 | Sato et al. | 307/296 R |
| 4,743,861 | 5/1988 | Jove et al. | 330/260 |
| 4,786,993 | 11/1988 | Jove et al. | 360/67 |
| 4,833,559 | 5/1989 | Belk | 360/113 |
| 4,879,610 | 11/1989 | Jove et al. | 360/67 |
| 4,914,398 | 4/1990 | Jove et al. | 328/167 |
| 5,032,935 | 7/1991 | Jove et al. | 360/67 |
| 5,103,353 | 4/1992 | Jove et al. | 360/67 |
| 5,122,915 | 6/1992 | Klein et al. | 360/113 |
| 5,204,789 | 4/1993 | Jove et al. | 360/67 |
| 5,229,894 | 7/1993 | Collins et al. | 360/43 |
| 5,235,472 | 8/1993 | Smith | 360/60 |

OTHER PUBLICATIONS

Magneto-Resistive Heads to Spur DCC, *Computer Technology Review*, vol. XII, No. 15, pp. 16, 21, Dec. 1992.

*Primary Examiner*—Aristotelis Psitos
*Assistant Examiner*—Won Tae C. Kim
*Attorney, Agent, or Firm*—Kinney & Lange

[57] ABSTRACT

A preamplifier configured for connection to a magnetoresistive transducer makes use of a first and second transistor connected in a common emitter differential pair configuration. The differential pair configuration has a pair of input terminals and a pair of output terminals. A first feedback circuit is included for providing feedback to at least one of a pair input terminals based on selected relatively slowly changing voltages between a pair of preamplifier output terminals. In this manner, the first feedback circuit minimizes differential voltages at the preamplifier output terminals. A second feedback circuit is provided for supplying feedback to at least one of the preamplifier input terminals based on relatively low frequency voltage magnitudes at one of the pair of input terminals. In this manner, a selected common mode voltage magnitude is maintained at one of the pair of input terminals.

20 Claims, 2 Drawing Sheets

ELECTRONICALLY COUPLED HIGH-IMPEDANCE MAGNETORESISTIVE PREAMPLIFIER

BACKGROUND OF THE INVENTION

The present invention relates to a preamplifier for use in a magnetic storage device having a magnetoresistive head. More particularly, the present invention relates to a preamplifier that is configured to provide a high input impedance for reducing lowpass filtering affects at the preamplifier input terminals thereby allowing the preamplifier to accommodate higher data rate signals from the magnetoresistive head.

Magnetic storage devices such as disc drives make use of a transducer for transferring information between the transducer and a magnetic media. One type of transducers that has been used in magnetic storage systems is the magnetoresistive (MR) or magnetostrictive transducer. The magnetoresistive transducer or head has the property that the resistance varies with magnetic flux passing through the head. Magnetic storage devices have utilized or exploited this relationship between the resistance of a MR head and the flux passing through the head to extract or read information from a magnetic storage media.

The MR head is often positioned proximate the magnetic media. As the magnetic media is moved past the MR head, the MR head senses changes in flux orientation produced by charged particles on the magnetic storage media as described in U.S. Pat. 4,191,977 to Lewkowicz, incorporated herein by reference. These changes in flux orientation are indicative of, among others, information stored on the magnetic media. Therefore, the resistance or changes in resistance of the MR element is indicative of information on the magnetic media.

The resistance of an MR element is, in part, a function of the strength of the magnetic flux to which it is exposed. Since the resistance of an MR element varies with magnetic flux, the current through, or the voltage across, the MR head is based not only on the data written on the magnetic media, but also the distance between the element and the magnetic media. In addition., temperature and process variations also affect the steady state resistance of the MR element. Accordingly, it is desirable to produce a preamplifier output signal that varies with changes in the magnetic flux, without varying significantly due to changes in the steady state resistance.

The MR heads are often biased with a constant current. As the magnetic flux passing through the MR head varies, a preamplifier detects the resistance changes of the MR head by detecting a change in voltage across the head. The output of the preamplifier is then provided to a second amplification stage and decoding circuitry for further processing.

A previously used preamplifier configuration for use with MR heads is a common base configuration as described in copending U.S. patent application Ser. No. 07/993,316 to Smith, inventor of the present invention, filed Dec. 18, 1992. The common base configuration has inherently low input impedance and is used to sense changes in current through the MR head. The common base preamplifier is coupled to the MR head using a coupling capacitor or other electronically coupling using a first and second feedback loop. The first feedback loop eliminates differential DC and low frequency components from the differential output of the common base preamplifier. The second feedback provides a common mode DC and low frequency component of the output signal to equal an externally supplied reference voltage.

One problem associated with the use of low input impedance preamplifier is that leads used to connect the MR head to the preamplifier input have an inductance that, together with the input impedance of the preamplifier, have a lowpass filtering effect at the preamplifier input. This low pass filtering affect tends to attenuate high frequency signals from the preamplifier input thereby reducing the bandwidth of the preamplifier. Disc drives having high data rates between the MR head and preamplifier input require signals having fast transition times. Signals having fast transition times have more high frequency components and require greater bandwidths. Therefore, it is necessary that any lowpass filtering effects be minimized or eliminated to improve the preamplifier bandwidth so that the data rate can be maximized.

SUMMARY OF THE INVENTION

The present invention is a preamplifier configuration which tends to reduce the attenuation of high frequency signals at the preamplifier input. In this manner the preamplifier of the present invention provides improved bandwidth thereby allowing the preamplifier to accommodate high data rates. The preamplifier has a pair of input terminals configured for connection to a magnetoresistive transducer and a pair of output terminals for providing a high frequency differential output signal representative of data stored on a magnetic storage media. The preamplifier includes a pair of input terminals and a pair of output terminals. The pair of input terminals has an input impedance associated therewith that is large relative to the input impedance associated with a common base configured preamplifier. A first feedback circuit is included for providing feedback to at least one of the pair of input terminals based on selected relatively low frequency voltages between the pair of output terminals. Thus, the first feedback circuit minimizes differential voltages at the pair of output terminals. Also included is a second feedback circuit for providing feedback to at least one of the pair of input terminals based on selected relatively low frequency voltage magnitudes at one of the pair of input terminals. Thus, the second feedback circuit maintains a selected voltage magnitude at one of the pair of input terminals.

In one preferred embodiment, the preamplifier of the present invention includes a first and second transistor connected in a common emitter differential pair configuration with the first and second transistors connected between the pair of input terminals. A first switch means operable to selectively provide bias current to the first transistor is included. Also included is a plurality of transistors each connected in parallel with the first transistor in a common emitter differential pair configuration with the second transistor. A switch means is included that is associated with each of the plurality of transistors for selectively connecting bias current thereto. A pair of input terminals are associated with each of the plurality of transistors to supply bias current to a magnetoresistive transducer connected therebetween. A control means is provided for selectively operating the first switch means as well as each of the plurality of switch means to selectively apply bias current to the first transistor and each of the plurality of transistors thereby providing a differential output signal associated with one of the first transistors and one of each of the plurality of transistors.

DETAILED DESCRIPTION OF THE PREFERRED EMBODIMENTS

Figure 1:
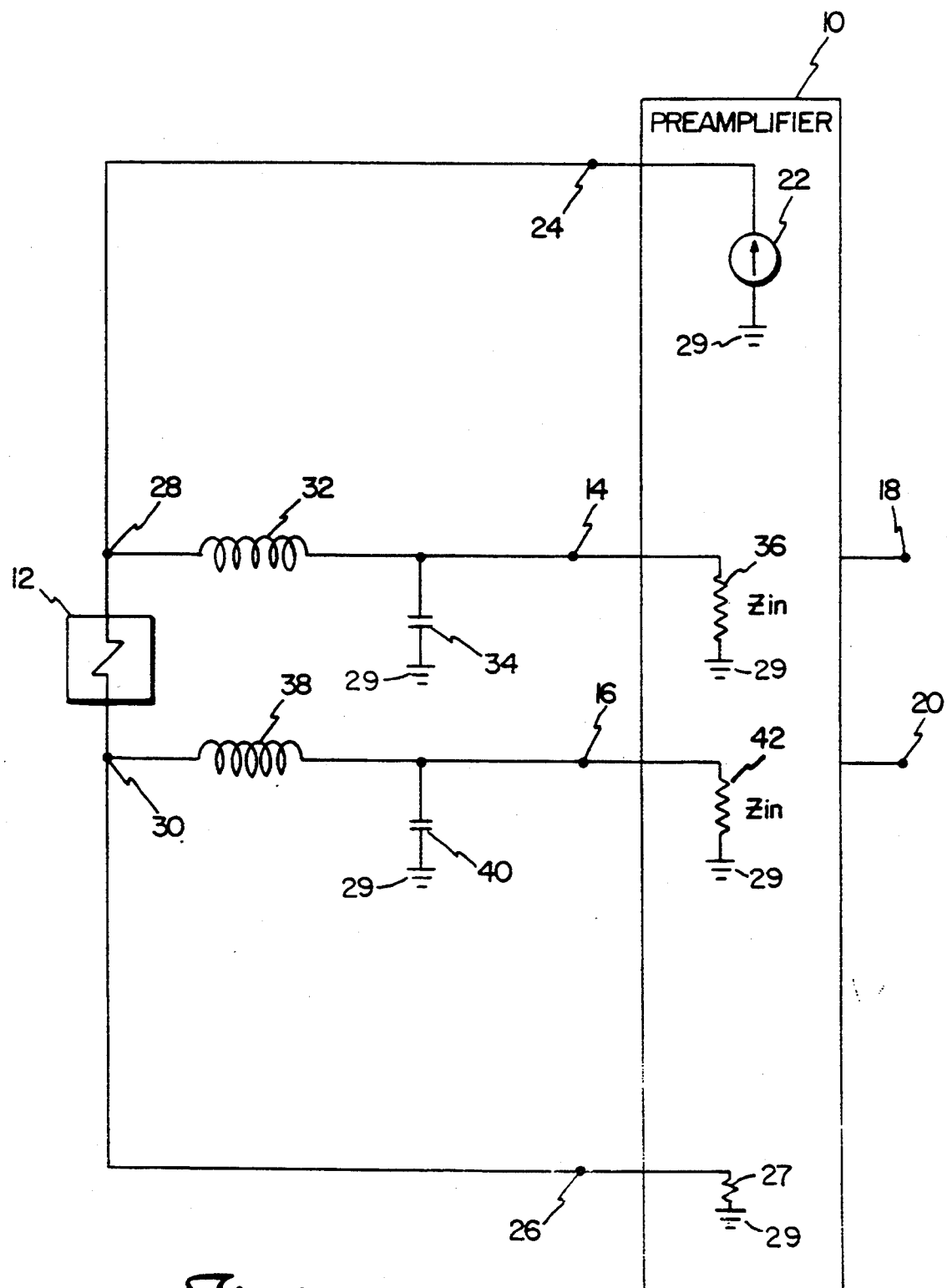
FIG. 1 is a schematic representation of lead inductance and stray capacitance of the leads which interconnect an MR head and a preamplifier.

Before discussing the details of preamplifier 10, a schematic representation of the leads used to interconnect the MR head 12 as illustrated in FIG. 1 will first be discussed. The preamplifier 10 has a pair of input terminals 14 and 16 for receiving a signal from the MR head 12 and a pair of output terminals 18 and 20 tier providing a preamplifier output signal to other amplification and decoding circuitry (not shown). The preamplifier 10 includes a bias circuit which includes a current source 22 for providing bias current to the MR head 12. The MR head 12 has a pair of terminals 28 and 30 that are connected between a pair of bias terminals 24 and 26 so that bias current is provided to the MR head 12 by current source 22. An impedance 27 is provided between the bias terminal 26 and a circuit common 29. The impedance 27 ensures a voltage potential at terminal 30 is different from a voltage potential of the circuit common 29 as will be discussed in greater detail later.

A first lead which has lead inductance 32 and stray capacitance 34 connects terminal 28 of MR head 12 to terminal 14 of preamplifier 10. The preamplifier 10 has an input impedance at input terminal 14 represented by resistor 36. A second lead which has lead inductance 38 and stray capacitance 40 interconnects terminal 30 of MR head 12 with input terminal 16 of preamplifier 10. The second terminal 16 of preamplifier 10 has an input impedance that is represented by resistor 42.

Magnetic disc storage systems frequently include a plurality of magnetic storage discs, sometimes referred to as a "disc stack", that rotate about a common axis. An actuator assembly includes a plurality of actuator arms for positioning each of a plurality of MR heads adjacent one of a plurality of disc surfaces within the disc stack. The preamplifiers 10 are mounted to the actuator assembly or to a circuit board or flexible circuit adjacent the actuator assembly. The preamplifiers 10 are preferably mounted as close as possible to the MR head 12 so that the length of the leads or wires used to connect the MR head 12 to the preamplifier 10 can be minimized. Minimizing the lead lengths tends to reduce the lead inductances 32 and 38 which tends to reduce the lowpass filtering effects and improve the bandwidth at the input terminals 14 and 16 as will be discussed in detail later.

The leads connected between the MR head 12 and the preamplifier 10 provide a signal indicative of resistance of MR head 12. The bias circuit provides a constant current from the current source 22 through the MR head 12. Changes in magnetic flux through the MR head 12 resulting from magnetized particles on the magnetic media moving past the MR head 12 produce changes in resistance between terminals 28 and 30 of the MR head 12 which are indicative of information stored on the magnetic media. Because a constant current is supplied to the MR head 12, these changes in resistance between terminals 28 and 30 produce corresponding voltages changes at these terminals 28 and 30. These voltage changes are indicative of information stored on the magnetic media and are provided to input terminals 14 and 16, respectively of preamplifier 10 by each of the leads.

High performance disc drives tend to have magnetic domains positioned close together on the magnetic storage media, creating a high density of data recording. Additionally, such drives have greater rotation rates than lower performance drives, resulting in higher data rates. Higher data rates tend to require faster voltage transitions at input terminals 14 and 16. Faster voltage transitions tend to produce higher frequency components in the voltage input signal thereby requiring greater bandwidth at the inputs 14 and 16 of preamplifier 10.

One limitation to the bandwidth of the input signal at input terminals 14 and 16 of preamplifier 10 is the lowpass filtering effect provided by the lead inductances 32 and 38 and input impedances 36 and 42 at the input terminals 14 and 16 of the preamplifier 10. The preamplifier 10 of the present invention tends to minimize or reduce this problem as will be discussed below. Another limitation to the bandwidth of the input signal is the stray capacitance 34 and 40 which tends to bypass to ground or short high frequency voltage signals across the MR head 12. The stray capacitances 34 and 40 should be minimized using known methods of lead layout so that the bypass or shorting effect of the this stray capacitance is tolerable.

A lowpass filter is effectively formed at each of the input terminals 14 and 16 of the preamplifier input 10 by the lead inductances 32 and 38 and the impedance these inductors see. The time constant, t, of this filter can be represented by the following equation:

Equation 1 $t = R/L$ where R is equal to the sum of the input impedance 36 of the preamplifier 10 and the impedance of the MR head 12, and L represents the sum of the lead inductances 32 and 38. The time constant, t, represents the radian frequency at which the amplitude spectrum has dropped to approximately 0.707 times its DC value. An input circuit having a larger time constant will produce a signal having higher frequency components and therefore a greater bandwidth at the input terminals 14 and 16 of the preamplifier 10.

Prior preamplifiers for use with an MR head have been common base type configured preamplifiers. In one form, this common base configuration had an input impedance on the order of 3.25 ohms. This relatively low input impedance common base type preamplifier was well suited for amplifying current changes in the MR head which are indicative of resistance changes as well as information stored on the magnetic media, but was not well suited to high data rates. The preamplifier 10 of the present invention, as will be discussed in more detail below, has an input impedance on the order of several thousand ohms. For MR heads having resistance and lead inductance approximately the same as previous devices, the time constant, t, of the high impedance preamplifier, will be about three orders of magnitude greater than the time constant, t, of the prior low impedance preamplifier. Therefore, the preamplifier 10 of the present invention provides improved bandwidth and therefore allows higher data rates than the relatively low impedance common base preamplifiers used previously.

Figure 2:
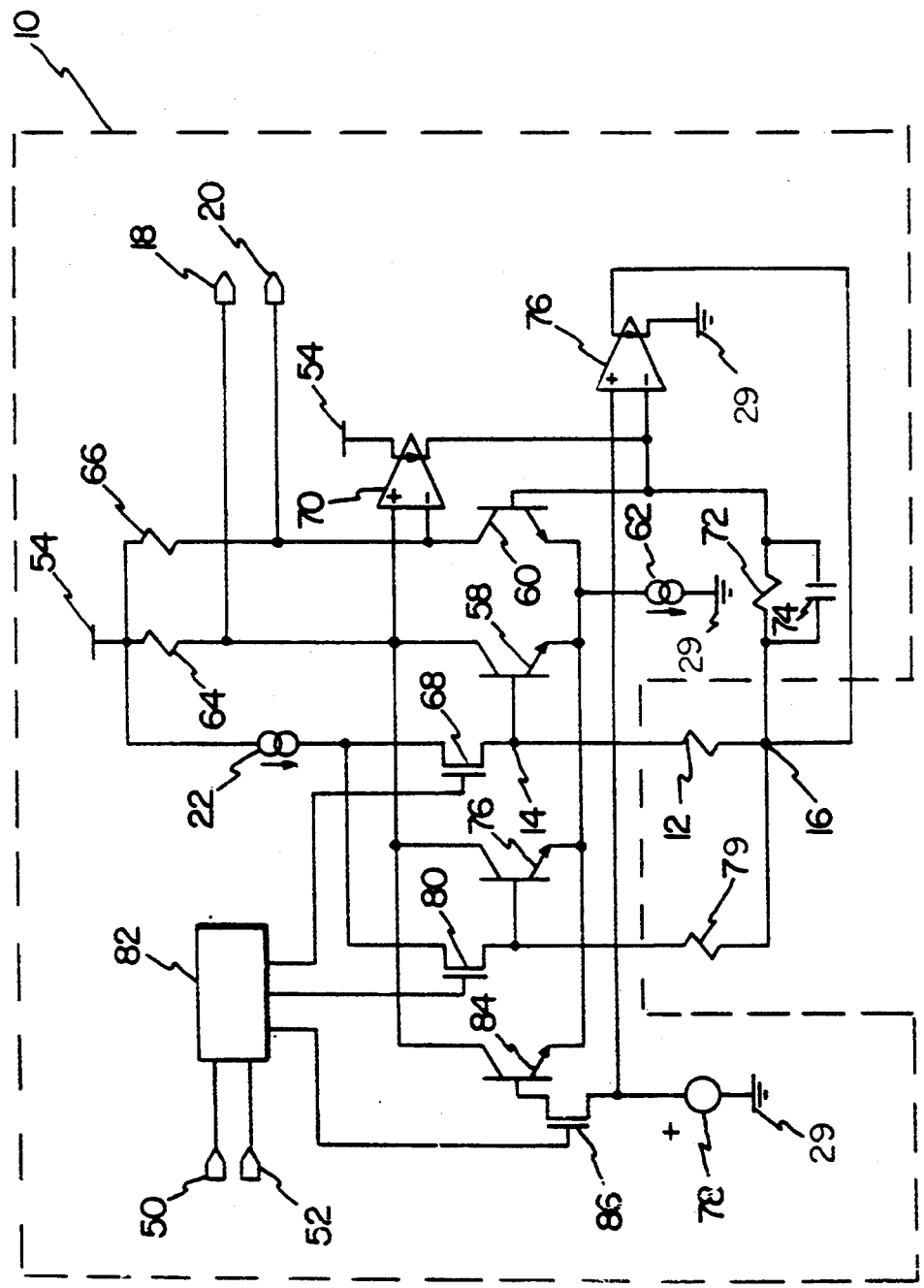
FIG. 2 is a preamplifier configuration of the present invention shown with a selection circuit for selecting one of a plurality of MR heads.

FIG. 2 shows the high input impedance preamplifier 10 of the present invention in greater detail. The preamplifier 10 has a pair of input terminals 14 and 16 with the MR head 12 connected therebetween. For simplicity, the lead inductances 32 and 38 and stray capacitance 34 and 40 as shown in FIG. 1 are not shown in FIG. 2. The preamplifier 10 provides a differential output signal at output terminals 18 and 20 that is provided to further amplification stages and decoding circuitry (not shown). Preamplifier 10 receives logic signals including a read gate enable signal at a terminal 50 and a head select signal at a terminal 52. These logic signals will be discussed in greater detail later.

The preamplifier 10 of the present invention is a differential amplifier. A differential transistor pair 58 and 60 are connected in a common emitter configuration between the supply terminals 54 and 29 with the base of transistor 58 connected to input terminal 14 and the base of transistor 60 connected to input terminal 16 via a compensation resistor 72 and a compensation capacitor 74. The compensation resistor 72 and compensation capacitor 74 will be discussed in more detail later. A supply voltage is provided between a first supply terminal 54 and a second supply terminal or circuit common 29. A current source 62 is connected between the emitters of transistors 58 and 60 and the second supply terminal 29. Also included in the differential amplifier are load resistors 64 and 66 that are connected between the first supply terminal and the collectors of transistors 58 and 60, respectively. The differential amplifier receives an input signal at input terminals 14 and 16 and provides a differential output signal at output terminals 18 and 20. Common emitter differential amplifiers are known and therefore this configuration will not be discussed in great detail. However, a significant property inherent in the common emitter configuration is a relatively high input impedance, typically several thousand ohms. The actual input impedance is dependent on process parameters of the specific manufacturing process used to fabricate the preamplifier.

A bias circuit is provided by the current source 22 to provide a bias current to the base of transistor 58 and the base of transistor 60 when switch device 68 is conducting. The switch device 68 has a conducting state whereby current is conducted therethrough and a non-conducting state whereby little current, if any, is conducted therethrough. The switch device 68 receives a control signal, as will be discussed in greater detail later, for selecting between conducting states and non-conducting states. The current source 22 also provides a bias current to the MR head 12. Bias current is provided to the MR head 12 so that a voltage across the MR head is related to the resistance of the MR head.

As a result of changes in resistance of the MR head 12, both low frequency voltage components as well as high frequency voltage components are produced across the MR head. These low frequency components include a DC or non-varying voltage component resulting from the bias current. Because only the high frequency voltage components are indicative of information stored on the magnetic media the low frequency voltage components which include a DC voltage component must be blocked or removed so that these components do not appear at the output terminals 18 and 20 of the preamplifier 10. The preamplifier 10 makes use of first and second feedback loops for eliminating these low frequency and DC voltages at the output terminals 18 and 20. The use of the first and second feedback loops eliminates the need for coupling capacitors previously used to couple relatively high frequency voltage signals that are produced across the MR head to the preamplifier input terminals 14 and 16. Additionally, the first and second feedback loops block or remove low frequency voltage signals which includes DC voltages from the preamplifier input terminals, another function previously accomplished with coupling capacitors. Coupling capacitors tend to be large and difficult to mount and are therefore undesirable.

The first feedback loop includes transconductance amplifier 70, compensation resistor 72 and compensation capacitor 74. This first feedback loop is configured to minimize any voltage difference between the collectors of transistors 58 and 60. The transconductance amplifier 70 has a pair of input terminals connected to the collector of transistors 58 and 60, respectively for providing an output current that is proportional to the voltage difference between the collectors of transistors 58 and 60 multiplied by a constant gain factor. This output current is provided to the base of transistor 60. The compensation resistor 72 and compensation capacitor 74 are connected in parallel between input terminal 16 and the base of transistor 60. This current provided by transconductance amplifier 70 is summed with the bias current provided by current source 22 thereby changing the voltage drop across the compensation resistor 72. The current provided by transconductance amplifier 70 also is provided to the base of transistor 60. This change in voltage drop across the compensation resistor 72 changes the voltage at the base of transistor 60 so that the voltage between the collectors of transistor 58 and 60 is minimized.

The second feedback loop includes transconductance amplifier 76. A reference voltage 78 is provided to maintain the voltage at the base of each of transistors 58 and 60 at the reference voltage. The transconductance amplifier 76 is connected to the reference voltage 78 and to the base of transistor 60. The transconductance amplifier 76 provides a current source between input terminal 16 and the second supply terminal 29 which sources current to the second supply terminal 29 or sinks a current that is equal to a gain of the transconductance amplifier multiplied by the voltage difference between the base of transistor 60 and the reference voltage 78. The current source within the transconductance amplifier 76 has an input impedance represented by the impedance 27 shown in FIG. 1. In this manner, the second feedback loop tends to maintain a voltage at the base of transistor 60 that is equal to the reference voltage 78.

The values of compensation resistor 72 and compensation capacitor 74 are selected for the desired bandwidth for the first and second feedback loops. The value of the compensation resistor 72 and compensation capacitor 74 determine the time constant or responsiveness of these feedback loops. These values should be selected such that the first and second feedback loops are not responsive to the relatively high frequency signals provided by the MR head that are indicative of data. However, these feedback loops should be sufficiently responsive so that the preamplifier 10 recovers quickly from transients such as switching MR heads. The first feedback loop provides feedback to at least one of the pair of input terminals based on selected relatively how frequency voltages between the pair of output terminals thereby minimizing differential voltages at the pair of output terminals. The second feedback loop provides feedback to at least one of the pair of input terminals based on selected relatively low frequency voltage magnitudes at one of the pair of input terminals thereby maintaining a selected voltage magnitude at one of the pair of input terminals. In one preferred embodiment, the second feedback loop maintains a selected common mode voltage magnitude at one of the pair of input terminals.

In one preferred embodiment, the preamplifier 10 is configured for selective connection to one of a plurality of MR heads. For this configuration of preamplifier 10, transistor 76 is connected in parallel with transistor 58 of the differential transistor pair. Transistor 76 has a collector connected to the collector of transistor 58 and an emitter that is connected to the emitter of transistor 58. A second MR head 79 is connected between a base of transistor 76 and the input terminal 16. A switching device 80 is connected between the current source 22 and the base of transistor 76. This switch device 80 is similar to switch device 68 and has a conducting state and a non-conducting state. The switch device 80 when conducting provides a bias current to the base of transistor 76 as well as to the base of transistor 60 through the MR head 79. The preamplifier 10 can be configured to more MR heads with the addition of transistor connected in parallel with transistors 58 and 76 and the addition of switch devices for selectively applying bias current to these transistors.

Control circuitry 82 receives the read gate enable signal 58 and the head select signal 52 from the disc storage device. The control circuitry 82 is connected to each of switch device 68 and switch device 80 for selectively configuring the preamplifier 10 to one of MR head 12 or MR head 79. For example, if the head select 52 is active, switching device 68 is conducting and switch 80 is nonconducting so that the preamplifier 10 is configured to read data from MR head 12. Alternatively, if head select signal 52 is not active, switch device 80 is conducting and switch device 68 is not conducting so that preamplifier 10 is reading data from MR head 79. In this manner, one preamplifier 10 is used to read data from one of a plurality of MR heads positioned adjacent one of a plurality of magnetic storage discs within the disc stack.

Transistor 84 and switch device 86 are provided to disable the preamplifier 10 from reading data from any of the MR heads 12 or 79. Transistor 84 is connected in parallel with each of transistor 76 and 58 with the collector of transistor 84 connected to the collectors of transistors 76 and 58 and the emitter of transistor 84 connected to the emitter of each of transistors 76, 58 and 60. The switch device 86 is similar to the switching devices 68 and 80 and is connected between a base of transistor 84 and the reference voltage 78. The switch device 86 is controlled by control logic 82. The preamplifier 10 is enabled if the read gate enable signal 50 is not active. If the read gate enable signal is not active, each of switch devices 68 and 80 are in a nonconductive state and switching device 86 is in a conductive state. Under this condition bias current in both of MR heads 12 and 79 approaches zero and each of the first and second feedback loops remain active. Because each of the first and second feedback loops are active the time required to switch from this read disable state to a state where the preamplifier 10 is enable to read from one of MR heads 12 or 79 with a minimal transient period.

The preamplifier 10 of the present invention is configured for providing a high input impedance thereby allowing the preamplifier to sense changes in voltage across the MR head. These changes in voltage are indicative of information stored on the magnetic storage media. The use of a first and second feedback loop allow relatively high frequency voltage signals across the MR head to appear at the output of the preamplifier while eliminating relatively low frequency voltage signals including DC voltage signals from appearing at the output terminals of the preamplifier. In this manner, the MR head is coupled to the preamplifier without requiring the use of a coupling capacitor which has several disadvantages. Most notable is that coupling capacitors are large and bulky and usually must be a capacitance value that is sufficiently large that it is impractical to form this capacitor on the same similar conductor die on which the preamplifier is formed.

Although the present invention has been described with reference to preferred embodiments, workers skilled in the art will recognize that changes may be made in form and detail without departing from the spirit and scope of the invention.

What is claimed is:

1. A preamplifier having a pair of input terminals configured for connection to a magnetoresistive transducer and a pair of output terminals for providing a high frequency differential output signal representative of data stored on a magnetic storage media, the preamplifier including:
   a pair of input terminals and a pair of output terminals, the pair of input terminals having an input impedance associated therewith that is large relative to an input impedance associated with a common base configured preamplifier;
   first feedback circuit providing feedback to at least one of the pair of input terminals based on selected relatively low frequency voltages between the pair of output terminals thereby minimizing differential voltages at the pair of output terminals; and
   second feedback circuit providing feedback to at least one of the pair of input terminals based on selected relatively low frequency voltage magnitudes at one of the pair of input terminals thereby maintaining a selected voltage magnitude at one of the pair of input terminals.

2. The preamplifier of claim 1 further including first and second transistors connected in a common emitter differential pair configuration with the first and second transistors connected between the pair of input terminals.

3. The preamplifier of claim 2 further including bias means for providing bias current to the pair of input terminals as well as to each of the differential pair configuration.

4. The preamplifier of claim 2 wherein the differential pair configuration further includes:
   current source means connected between each of the first and second transistor emitters and a first supply terminal for providing a constant current therebetween; and
   first load means connected between a second supply and the first transistor collector and second load means connected between the second supply and the second transistor collector so that collector currents in the first and second transistor provide voltage across the first and second load means.

5. The preamplifier of claim 2 wherein the differential pair configuration includes a first switch means operable to selectively provide bias current to the first transistor and further including a plurality of transistors each connected in parallel with the first transistor in a common emitter differential pair configuration with the second transistor, and switch means associated with each of the plurality of transistors for selectively connecting bias current thereto, a pair of input terminals being associated with each of the plurality of transistors to supply bias current to a magnetoresistive transducer connected thereto.

6. The preamplifier of claim 5 further including control means for selectively operating the first switch means as well as each of the plurality of switch means to selectively apply bias current to the first transistor and each of the plurality of transistors thereby providing a differential output signal associated with one of the first transistor and the plurality of transistors.

7. The preamplifier of claim 2 wherein the first feedback circuit includes:
    load means connected between a base terminal associated with each of the first and second transistor; and
    transconductance means for providing current through the load means based on relatively low frequency voltages between the pair of output terminals so that differential voltages not related to data are minimized at the pair of output terminals.

8. The preamplifier of claim 7 wherein the transconductance means further includes a capacitor connected across the load means for eliminating relatively high frequency voltages representative of data from forming across the load means so that the differential voltages representative of data are provided at the pair of output terminals.

9. The preamplifier of claim 1 wherein the first feedback circuit includes a lowpass filter for distinguishing between relatively low frequency differential output voltages not representative of data and differential output voltages representative of data so that the feedback circuit eliminates differential output voltages at the pair of output terminals that are not representative of data.

10. The preamplifier of claim 1 wherein the second feedback circuit includes:
    voltage reference means for providing a reference voltage; and transconductance means varying current between the pair of input terminals based on a voltage difference between the reference voltage and a voltage at one of the pair of input terminals.

11. The preamplifier of claim 10 further including first and second transistors connected in a common emitter differential pair configuration with the first and second transistors connected between the pair of input terminals and wherein the transconductance means includes:
    a load means connected between a base terminal associated with the first and second transistor; and
    current sink means connected between one of the pair of input terminals and a supply terminal for adjusting relative amounts of current passing therebetween based on a voltage between the reference voltage and a voltage at one of the pair of input terminals.

12. A magnetic storage system suited for retrieving data stored on a magnetic storage media, the magnetic storage system including:
    a magnetoresistive transducer having first and second transducer terminals;
    first and second conducting means with the first conducting means being connected to the first transducer terminal and the second conducting means being connected to the second transducer terminal;
    preamplifier means having first and second input terminals with the first input terminal connected to the first conducting means and the second input terminal connected to the second conducting means, the preamplifier being configured to have an input impedance that is large relative to an input impedance associated with a common base configured preamplifier;
    first feedback circuit providing feedback to at least one of the pair of input terminals based on selected relatively low frequency voltages between the pair of output terminals thereby minimizing differential voltages at the pair of output terminals; and
    second feedback circuit providing feedback to at least one of the pair of input terminals based on relatively low frequency voltage magnitudes at one of the pair of input terminals thereby maintaining a selected common mode voltage magnitude at one of the pair of input terminals.

13. The magnetic storage system of claim 12 wherein the preamplifier means comprises first and second transistor connected in a common emitter differential pair configuration, the differential pair configuration having a pair of input terminals and a pair of output terminals, the magnetoresistive transducer being connected between the pair of input terminals.

14. The magnetic storage system of claim 13 further including bias means for providing bias current to the pair of input terminals and each transducer of the differential pair configuration.

15. The magnetic storage system of claim 12 wherein the first feedback circuit includes a lowpass filter for distinguishing between relatively low frequency differential output voltages not representative of data and differential output voltages representative of data so that the feedback circuit eliminates differential output voltages at the output terminals that are not representative of data.

16. The magnetic storage system of claims 12 wherein the preamplifier includes first switch means operable to selectively provide bias current to a first transistor of a differential pair, a plurality of transistors each connected in parallel with the first transistor in a common emitter differential pair configuration with the first transistor and with each of the plurality of transistors having each of a plurality of switch means associated therewith for selectively applying bias current thereto, each of the plurality of transistors having a plurality of input terminals associated therewith.

17. The magnetic storage system of claim 16 further including control means for selectively operating the first switch means as well as each of the plurality of switch means to selectively apply bias current to the first transistor and each of the plurality of transistors thereby providing a differential output signal associated with one of the first transistor and the plurality of transistors.

18. The magnetic storage system of claim 12 wherein the second feedback circuit includes:

voltage reference means for providing a reference voltage; and transconductance means varying current between the pair of input terminals based on a voltage difference between the reference voltage and a voltage at one of the pair of input terminals.

19. The magnetic storage system of claim 12 wherein the first feedback circuit includes:

load means connected between the first and second transistor base terminals; and transconductance means for providing current through the load means based on relatively low frequency voltages between the pair of output terminals so that differential voltages not related to data are minimized at the pair of output terminals.

20. The magnetic storage system of claim 19 wherein the transconductance means further includes a capacitor connected across the load means for eliminating relatively high frequency voltages representative of data from forming across the load means so that the differential voltages representative of data are provided at the pair of output terminals.

* * * * *